(12) United States Patent
Ganninger et al.

(10) Patent No.: US 11,844,419 B2
(45) Date of Patent: Dec. 19, 2023

(54) CLEANING ELEMENT CARRIER AND TOOTHBRUSH HEAD COMPRISING IT

(71) Applicant: The Procter & Gamble Company, Cincinnati, OH (US)

(72) Inventors: Jochen Ganninger, Eschborn (DE); Ulrich Störkel, Bad Nauheim (DE); Holger Schulz, Frankfurt (DE); Niclas Altmann, Niddatal (DE); Uwe Tretrop, Frankfurt (DE); Stefan Triebig, Birkenfeld (DE); Stefan Scheurich, Triefenstein (DE)

(73) Assignee: The Procter & Gamble Company, Cincinnati, OH (US)

( * ) Notice: Subject to any disclaimer, the term of this patent is extended or adjusted under 35 U.S.C. 154(b) by 396 days.

(21) Appl. No.: 16/898,344

(22) Filed: Jun. 10, 2020

(65) Prior Publication Data
US 2020/0397130 A1 Dec. 24, 2020

(30) Foreign Application Priority Data
Jun. 21, 2019 (EP) .................... 19181666

(51) Int. Cl.
*A46B 13/00* (2006.01)
*A46B 7/00* (2006.01)
(Continued)

(52) U.S. Cl.
CPC .............. *A46B 13/008* (2013.01); *A46B 3/06* (2013.01); *A46B 3/22* (2013.01); *A46B 7/00* (2013.01); *A46B 7/04* (2013.01); *A46B 7/08* (2013.01); *A46B 9/04* (2013.01); *A46B 9/06* (2013.01); *A46B 9/065* (2013.01); *A46B 13/02* (2013.01); *A46D 3/005* (2013.01); *A46D 3/045* (2013.01);
(Continued)

(58) Field of Classification Search
CPC .... A46B 7/06; A46B 7/08; A46B 9/04; A46B 9/06; A46B 9/065; A46B 13/02; A46B 13/08; A46B 9/026; A46B 13/008
USPC ................................... D4/111, 109
See application file for complete search history.

(56) References Cited

U.S. PATENT DOCUMENTS 2,923,598 A 2/1960 Reis, Jr. et al.
3,076,218 A 2/1963 Cook et al.
(Continued)

FOREIGN PATENT DOCUMENTS

CN 2259084 Y 8/1997
CN 1504139 A 6/2004
(Continued)

OTHER PUBLICATIONS

Extended European Search Report and Search Opinion; Application Ser. No. 19181666.9; dated Dec. 6, 2019; 7 pages.
(Continued)

*Primary Examiner* — Laura C Guidotti
(74) *Attorney, Agent, or Firm* — Gregory S. Darley-Emerson

(57) ABSTRACT

A cleaning element carrier for a toothbrush in a form of a disk has a back surface including a central depression covering at least 70% of the back surface and forming an edge at the border. The carrier's front surface includes at least one protrusion so that the front surface comprises two levels, wherein the area covered by the depression is larger than the area covered by the protrusion.

27 Claims, 5 Drawing Sheets

(51) Int. Cl.
  *A46B 7/04* (2006.01)
  *A46B 9/04* (2006.01)
  *A46B 9/06* (2006.01)
  *A46B 13/02* (2006.01)
  *A46D 3/00* (2006.01)
  *A61C 17/22* (2006.01)
  *A46B 7/08* (2006.01)
  *A46B 3/06* (2006.01)
  *A46B 3/22* (2006.01)
  *A46D 3/04* (2006.01)
  *A46B 3/04* (2006.01)
  *A46B 9/02* (2006.01)
  *A46B 15/00* (2006.01)

(52) U.S. Cl.
  CPC ............ *A61C 17/222* (2013.01); *A46B 3/04* (2013.01); *A46B 9/028* (2013.01); *A46B 15/0081* (2013.01); *A46B 2200/1066* (2013.01)

(56) References Cited

U.S. PATENT DOCUMENTS

| | | | |
|---|---|---|---|
| 4,255,224 A | 3/1981 | Lorenz | |
| 4,697,851 A | 10/1987 | Takahashi | |
| 5,033,797 A | 7/1991 | Rueb | |
| 5,040,260 A * | 8/1991 | Michaels | A46D 1/00 15/207.2 |
| 5,431,484 A | 7/1995 | Zahoransky et al. | |
| 6,036,277 A | 3/2000 | Weihrauch | |
| 6,044,514 A * | 4/2000 | Kaneda | A46B 9/06 15/207.2 |
| 6,402,494 B1 * | 6/2002 | Lanvers | B29C 45/1635 264/328.8 |
| 6,726,789 B1 | 4/2004 | Weihrauch | |
| 6,735,803 B2 * | 5/2004 | Kuo | A61C 17/227 15/28 |
| 6,779,851 B2 | 8/2004 | Bouchiere | |
| 6,862,771 B1 | 3/2005 | Muller | |
| 6,865,767 B1 | 3/2005 | Gavney, Jr. | |
| 7,162,767 B2 * | 1/2007 | Pfenniger | A46B 9/026 15/201 |
| 7,174,596 B2 | 2/2007 | Fischer et al. | |
| 7,281,768 B2 | 10/2007 | Sato et al. | |
| 7,434,288 B2 | 10/2008 | Gavney, Jr. | |
| 7,644,466 B2 | 1/2010 | Weihrauch et al. | |
| 7,814,604 B2 | 10/2010 | Gavney, Jr. | |
| 7,861,356 B2 | 1/2011 | Kunath et al. | |
| 8,132,284 B1 | 3/2012 | Kraemer | |
| 8,677,545 B2 | 3/2014 | Vitt et al. | |
| 9,144,299 B2 | 9/2015 | Fritsch et al. | |
| 9,398,802 B2 | 7/2016 | Moskovich et al. | |
| 9,402,461 B2 | 8/2016 | Brik | |
| 9,635,928 B2 | 5/2017 | Morgott | |
| 9,636,898 B2 | 5/2017 | Ganninger | |
| 9,750,334 B2 | 9/2017 | Kirchhofer et al. | |
| 2001/0023516 A1 | 9/2001 | Driesen et al. | |
| 2002/0152570 A1 | 10/2002 | Hohlbein | |
| 2003/0159224 A1 | 8/2003 | Fischer et al. | |
| 2004/0117934 A1 | 6/2004 | Pfenniger | |
| 2005/0015904 A1 | 1/2005 | Gavney | |
| 2005/0060826 A1 | 3/2005 | Gavney | |
| 2005/0155172 A1 | 7/2005 | Gavney | |
| 2005/0160546 A1 | 7/2005 | Weihrauch | |
| 2005/0193512 A1 | 9/2005 | Moskovich et al. | |
| 2006/0080795 A1 | 4/2006 | Pfenniger et al. | |
| 2006/0129171 A1 | 6/2006 | Moskovich | |
| 2006/0230563 A1 | 10/2006 | Gavney, Jr. | |
| 2007/0094824 A1 | 5/2007 | Pfenniger et al. | |
| 2007/0256263 A1 | 11/2007 | Kunath et al. | |
| 2009/0193604 A1 | 8/2009 | Pfenniger et al. | |
| 2011/0000041 A1 | 1/2011 | Vitt et al. | |
| 2011/0010881 A1 | 1/2011 | Pfenniger et al. | |
| 2011/0030158 A1 | 2/2011 | Gavney, Jr. | |
| 2011/0258797 A1 | 10/2011 | Pfenniger et al. | |
| 2011/0304194 A1 | 12/2011 | Uchida et al. | |
| 2012/0081784 A1 | 4/2012 | Sakurai et al. | |
| 2012/0246857 A1 | 10/2012 | Kato et al. | |
| 2012/0317737 A1 | 12/2012 | Birk | |
| 2012/0317738 A1 | 12/2012 | Birk | |
| 2013/0019425 A1 | 1/2013 | Bresselschmidt | |
| 2013/0139338 A1 | 6/2013 | Hess et al. | |
| 2013/0180069 A1 | 7/2013 | Pfenniger et al. | |
| 2013/0241267 A1 | 9/2013 | Kumpf | |
| 2013/0291320 A1 | 11/2013 | Kirchhofer et al. | |
| 2013/0326834 A1 | 12/2013 | Vankov | |
| 2014/0075696 A1 | 3/2014 | Pfenniger et al. | |
| 2014/0123423 A1 | 5/2014 | Morgott | |
| 2014/0232173 A1 | 8/2014 | Birk | |
| 2014/0352093 A1 | 12/2014 | Bresselschmidt et al. | |
| 2014/0359956 A1 | 12/2014 | Jungnickel et al. | |
| 2014/0359957 A1 | 12/2014 | Jungnickel | |
| 2015/0097309 A1 | 4/2015 | Newman et al. | |
| 2015/0150369 A1 | 6/2015 | Bresselschmidt | |
| 2015/0238004 A1 | 8/2015 | Brik | |
| 2015/0257525 A1 | 9/2015 | Kang et al. | |
| 2016/0088925 A1 | 3/2016 | Pfenniger et al. | |
| 2017/0020278 A1 | 1/2017 | Xi et al. | |
| 2017/0128178 A1 | 5/2017 | Schmidt et al. | |
| 2017/0135462 A1 * | 5/2017 | Willi | A46B 7/02 |
| 2017/0215567 A1 | 8/2017 | Waguespack | |
| 2017/0318947 A1 | 11/2017 | Kirchhofer et al. | |
| 2017/0367474 A1 | 12/2017 | Machlitt et al. | |
| 2018/0000236 A1 | 1/2018 | Scheurich | |
| 2018/0289140 A1 | 10/2018 | Dengler | |
| 2020/0107919 A1 | 4/2020 | Dengler et al. | |
| 2020/0397134 A1 | 12/2020 | Ganninger et al. | |
| 2020/0397135 A1 | 12/2020 | Ganninger et al. | |
| 2020/0397136 A1 | 12/2020 | Ganninger et al. | |
| 2020/0397137 A1 | 12/2020 | Ganninger et al. | |
| 2021/0068526 A1 | 3/2021 | Kim | |
| 2022/0192356 A1 | 6/2022 | Jimenez et al. | |

FOREIGN PATENT DOCUMENTS

| | | | |
|---|---|---|---|
| CN | 101081123 A | 12/2007 | |
| CN | 101332012 A | 12/2008 | |
| CN | 101668454 A | 3/2010 | |
| CN | 101674751 A | 3/2010 | |
| CN | 102245052 A | 11/2011 | |
| CN | 102824023 A | 12/2012 | |
| CN | 103260463 A | 8/2013 | |
| CN | 107645917 A | 1/2018 | |
| CN | 109414106 A | 3/2019 | |
| DE | 941364 C | 4/1956 | |
| DE | 10217527 A1 | 11/2003 | |
| DE | 102009039514 | 3/2011 | |
| DE | 102012021311 A1 | 4/2014 | |
| EP | 1726237 A1 | 11/2006 | |
| EP | 1864588 A2 | 12/2007 | |
| EP | 2810581 | 12/2014 | |
| GB | 601371 A | 5/1948 | |
| JP | H0580324 U | 11/1993 | |
| JP | 2003061753 A | 3/2003 | |
| JP | 2011131087 A | 7/2011 | |
| JP | 3172569 U | 12/2011 | |
| JP | 6423630 B2 | 10/2018 | |
| KR | 20060026646 A * | 3/2006 | A46B 3/06 |
| WO | 2005115196 A2 | 12/2005 | |
| WO | 2007051099 A2 | 5/2007 | |
| WO | 2010025820 A2 | 3/2010 | |
| WO | 2011070549 A1 | 6/2011 | |
| WO | 2012174066 A2 | 12/2012 | |
| WO | 2015085536 A1 | 6/2015 | |
| WO | 2015183272 A1 | 12/2015 | |
| WO | 2016014051 A1 | 1/2016 | |
| WO | WO2019011599 | 1/2019 | |

OTHER PUBLICATIONS

International Search Report and Written Opinion; Application Ser. No. PCT/US2020/070146; dated Jul. 20, 2020; 9 pages.

(56) References Cited

OTHER PUBLICATIONS

All Office Actions; U.S. Appl. No. 18/111,203, filed Feb. 17, 2023.
All Office Actions; U.S. Appl. No. 18/113,141, filed Feb. 23, 2023.
Unpublished U.S. Appl. No. 18/111,203, filed Feb. 17, 2023, to Jochen Ganninger et al.
Unpublished U.S. Appl. No. 18/113,141, filed Feb. 23, 2023, to Jochen Ganninger et al.
Non Final Office Action; U.S. Appl. No. 16/898,313; dated Aug. 2, 2023.
Non Final Office Action; U.S. Appl. No. 16/898,359; dated Dec. 7, 2022.
Non Final Office Action; U.S. Appl. No. 16/898,372 dated Dec. 9, 2012.
Final Office Action; U.S. Appl. No. 15/634,813 dated Mar. 30, 2021.
Final Office Action; U.S. Appl. No. 15/634,813 dated Sep. 12, 2019.
Final Office Action; U.S. Appl. No. 15/634,950 dated Sep. 9, 2019.
Final Office Action; U.S. Appl. No. 15/634,950 dated Dec. 28, 2020.
Final Office Action; U.S. Appl. No. 16/898,382 dated Jul. 21, 2022.
Non Final Office Action; U.S. Appl. No. 15/634,813 dated Feb. 4, 2019.
Non Final Office Action; U.S. Appl. No. 15/634,813 dated Sep. 3, 2020.
Non Final Office Action; U.S. Appl. No. 15/634,950 dated Feb. 27, 2019.
Non Final Office Action; U.S. Appl. No. 15/634,950 dated Jun. 15, 2020.
Non Final Office Action; U.S. Appl. No. 16/898,382 dated Jan. 25, 2022.
Notice of Allowance; U.S. Appl. No. 15/634,813 dated Jan. 7, 2022.
Notice of Allowance; U.S. Appl. No. 15/634,813 dated Mar. 23, 2022.
Notice of Allowance; U.S. Appl. No. 15/634,950 dated Jul. 9, 2021.
Notice of Allowance; U.S. Appl. No. 15/634,950 dated Aug. 6, 2021.
All Office Actions; U.S. Appl. No. 18/215,256, filed Jun. 28, 2023.
Unpublished U.S. Appl. No. 18/215,256, filed Jun. 28, 2023, to Jochen Ganninger et al.

\* cited by examiner

CLEANING ELEMENT CARRIER AND TOOTHBRUSH HEAD COMPRISING IT

FIELD OF THE INVENTION

Modern brush heads, in particular toothbrush heads, show high design flexibility. Several requirements, such as deep cleaning, sensitive cleaning, gum massage, cleaning of tooth with dental brace etc. require different brush heads comprising various arrangements of different types of cleaning elements. In addition, the consumer asks for a good mouth feeling also during brushing which limits e.g. size or thickness of the toothbrush head. Thus, an improved manufacturing process is needed that allows high design flexibility in order to meet all requirements of modern toothbrushes. For example, different cleaning elements, such as elastomeric cleaning elements and different types of bristle tufts has to be arranged together at one brush head securely. The present invention is directed to a cleaning element carrier for a (tooth)brush head, or a part thereof which allows to integrate a high variability of different types of cleaning elements.

BACKGROUND OF THE INVENTION

Methods of producing brush heads or parts thereof are already known in the prior art. Fusing of the bristle tuft ends to form fuse balls is one important step in most of the methods. The resulting fuse balls do not only connect the individual bristle filaments of one bristle tuft with each other, but also helps to securely mount the bristle tufts in the brush head. In particular, fuse balls that are larger than the bristle tufts may anchor the bristle tufts in brush heads.

One method of production using said anchoring is the anchor-free tufting (AFT) method developed by Bart G. Boucherie. Thereby the bristle tufts are pushed through the holes of a hole perforation plate and the end of the tuft which is not intended for cleaning will be fused by application of thermal energy. The fuse balls formed thereby are larger than the holes so that the bristle tufts stuck at the backside of the hole perforation plate. The fuse balls may be combined with the hole perforation plate as well, e.g. by the thermal energy applied or by ultrasound welding; then the perforation plate is mounted together with the bristle tufts into a brush head (EP1142505B1). Homogenous size, form and shape of the fuse balls is not important for the AFT method.

In contrast, in the hot tufting method as developed by Ulrich Zahoransky the bristle tufts are arranged in holes of a mold bar so that the fuse balls are available for over-molding with plastic material. During said over-molding the brush head is formed at least partially and the bristle tufts and the forming brush head are combined. Due to fuse balls that are larger than the bristle tufts themselves undercuts are formed during the over-molding process so that the bristle tufts and the brush head are combined securely. Geometric requirements of the brush heads to be formed can be met using the hot tufting method.

There exists a continuous need in toothbrush manufacturing to further increase flexibility in brush head design. Thereby, different types of cleaning elements as well as different types of bristle tufts have to be included into one brush head securely.

SUMMARY OF THE INVENTION

According to one aspect there is provided a cleaning element carrier for a toothbrush in form of a disk comprising a front surface, a back surface and a thickness, wherein the back surface comprises a central depression covering at least 70% of the back surface and forming an edge at the border and wherein the front surface comprises at least one protrusion so that the front surface comprises two levels, wherein the area covered by the depression is larger than the area covered by the protrusion part of a brush head, in particular a toothbrush head.

According to another aspect a manual toothbrush or a replacement brush head for an electric toothbrush is provided that comprises a cleaning element carrier as disclosed herein.

According to another aspect a cleaning element carrier and a (tooth)brush head comprising such a cleaning element carrier are provided which are manufactured with a method as described herein.

DETAILED DESCRIPTION OF THE INVENTION

Figure 1A:
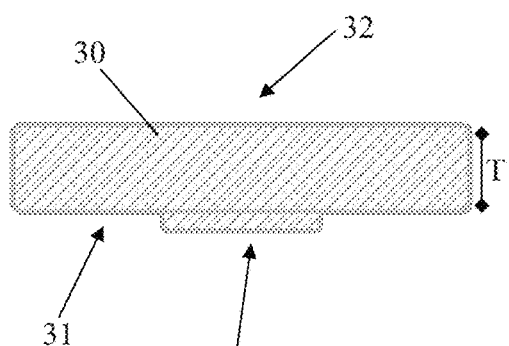
FIG. 1A shows a side view of an example embodiment of a cleaning element carrier having a central protrusion.

The following is a description of numerous embodiments of a method of producing a brush head or a part thereof as well as the brush head or the part thereof that are produced with the method as disclosed herein. The description is to be construed as exemplary only and does not describe every possible embodiment since describing every possible embodiment would be impractical, if not impossible, and it will be understood that any feature, characteristic, structure, component, step or methodology described herein can be deleted, combined with or substituted for, in whole or in part, any other feature, characteristic, structure, component, product step or methodology described herein. In addition, single features or (sub)combinations of features may have inventive character irrespective of the feature combination provided by the claims, the respective part of the specification or the drawings.

By "cm" as used herein is meant centimeter. By "mm" as used herein is meant millimeter. By "μm" or "microns" as used herein is meant micrometer. By "mil" as used herein is meant a thousandth of an inch.

As used herein, the word "about" means +/−10 percent.

As used herein, the word "comprise," and its variants, are intended to be non-limiting, such that recitation of items in a list is not to the exclusion of other like items that may also be useful in the materials, devices, and methods of this invention. This term encompasses the terms "consisting of" and "consisting essentially of".

As used herein, the word "include," and its variants, are intended to be non-limiting, such that recitation of items in a list is not to the exclusion of other like items that may also be useful in the materials, devices, and methods of this invention.

As used herein, the words "preferred", "preferably" and variants, such as "in particular" and "particularly" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

There is provided a method for producing a brush head, in particular a toothbrush head or a part thereof comprising providing at least two bristle tufts comprising a plurality of bristle filaments, wherein the at least two bristle tufts differ in at least one property. The term "bristle tuft" as used herein shall be understood as any shape, form, size and/or arrangement of bristle filaments of a predefined length. Any geometric shape, form or arrangement that can be produced by grouping individual bristle filaments can form a bristle tuft. Standard shapes that are given as an example are round bristle tufts, elliptic bristle tufts, sickle-shaped bristle tufts, bristle tuft stripes, or combinations thereof. In addition, two or more bristle tuft may be arranged in a tuft-in-tuft arrangement, wherein the shape of each individual tuft may be the same or different and is combined from the alternatives given before. For example a round tuft may be arranged in a round tuft, or a round tuft may be arranged in an elliptic tuft, or a striped tuft may be arranged in a round tuft etc. In a tuft-in-tuft arrangement the two tufts may differ in the at least one property or may be identical regarding the at least one property. The at least two bristle tufts that differ in at least one property are arranged in a hole perforation plate comprising a front surface, a back surface, a thickness and one or more, preferably a plurality of holes, wherein the one or more, preferably the plurality of holes is distributed in the hole perforation plate according to the desired bristle field of the brush head or the part thereof to be produced.

In the following the hole perforation plate will be disclosed in more detail. In one embodiment, the hole perforation plate comprises a front surface, a back surface, a thickness and one or more, preferably a plurality of holes, wherein the holes may be grouped into more than one arrangements of holes, wherein the more than one arrangements of holes may be identical or different compared to each other, preferably identical of different regarding the number of the holes, the shape of the holes, the size of the holes, the distance between the holes and a combination thereof. That means the hole perforation plate may comprise a plurality of arrangements of holes, wherein each arrangement corresponds to the desired bristle field of the brush head or the part thereof to be produced, preferably of round or an elongated form, more preferred a form of a head of a manual toothbrush or a head for a replacement brush head of an electric toothbrush. Alternatively, the hole perforation plate may comprise only one arrangement of holes that correspond to the desired bristle field. Preferably, the hole perforation plate comprises identical arrangements of holes, more preferred the hole perforation plate comprises 4 identical arrangements of holes. In addition, more than one hole perforation plates, e.g. two hole perforation plates, may be combined to a larger hole perforation plate. The number of holes in one arrangement may be in the range of 1 to 60 holes, preferably 10 to 60 holes, more preferred 15 to 40 holes, more preferred 15 to 35 holes, more preferred 15 to 30 holes. The distance between neighboring holes in one arrangement is in the range of 0.2 mm to 2.0 mm, preferably in the range of 0.4 mm to 1.8 mm, more preferred in the range of 0.5 mm to 1.2 mm. The distance between neighboring arrangements in one hole perforation plate is defined by design and the molding process used, which might be at least 2 mm, in particular in the range of 2 mm to 40 mm.

The shape of the holes in the hole perforation plate corresponds to the shape of the bristle tuft which shall be located in the corresponding hole. A bristle tuft can be manufactured in any form, wherein the form may be adapted according to the function of the tuft, the position of the tuft within the bristle field, the form of the cleaning element carrier and/or a combination thereof. During location of the bristle tuft in the holes of the hole perforation plate the bristle tuft adapts the shape of the hole and can be fixed in this shape during further processing steps, such as fusing. Suitable shapes of the holes of the hole perforation plate are round, half-round, sickle-shaped, elliptic, elongate, angled, e.g. quadrangular, trapezoidal, pentagonal, hexagonal, heptagonal, octagonal or a mixture thereof. All different shapes can be combined to each other, e.g. a half-round shape can be combined with a quadrangular shape or a trapezoidal shape might be combined with a sickle-shape. Preferred holes of the hole perforation plate are round, oval, half-round, sickle-shaped, elongate or angled, more preferred round or oval.

In addition or alternatively, the size of a hole depends on the tuft to be integrated. Thus, the size of a hole may be in the range of about 0.6 mm² to about 40 mm². A suitable size of a hole for a round standard bristle tuft is in the range of 0.6 mm² to 3 mm², preferably in the range of 1.0 mm² to 2 mm², more preferred about 1.5 mm². In addition or alternatively, the hole perforation plate may also comprise hole(s) for bristle tufts having the size of a plurality of a standard bristle tuft, in particular the size of 2 to 25 bristle tufts, more particular 2 to 15 bristle tufts, more particular 5 to 10 bristle tufts. A preferred embodiment of a large tuft comprising the size of more than one standard tuft may be for example a block bristle tufts comprising a combination from about 5 to 15 bristle tufts. Accordingly, a preferred range for holes for block tufts might be in the range of about 8 mm² to about 24 mm², more preferred in the range of about 8 mm² to about 16 mm².

The hole perforation plate to be used in the method as disclosed herein may be made from any suitable material which is resistant to the method steps as disclosed herein and which can be formed. A heat resistant material is preferred, because the hole perforation plate as disclosed herein is used inter alia as part of a mold. A suitable material for a hole perforation plate as used herein are any heat resistant material, in particular metal and metal alloys, such as steel, in particular stainless steel, a heat resistant plastic, in particular polytetrafluorethylene (PTFE) or polyetheretherketon (PEEK), ceramic or a combination thereof. The hole perforation plate may be produced by any method that allows to form high precision components, such as metal casting, in particular aluminum casting, 3D-printing, vitrification, pulsed electrochemical machining (PECM), molding. Depending on the manufacturing method used the hole perforation plate may be a single component or a base component comprising several component parts. For example, the base component may be made from steel comprising cavities for inserts comprising the hole arrangements as described above. Such an arrangement allows to use one base component for the manufacturing of different bristle fields just by changing the arrangements of holes. In addition, the arrangements of holes which need to be of high quality and high precision can be produced independently from the base component.

In a preferred embodiment, the hole perforation plate may comprise an uneven front surface, preferably an uneven front surface in the area of the arrangement of the holes, more preferred, wherein the front surface in the area of the arrangement of the holes is a convex surface. Thus, the holes of one arrangement may be le located at different levels of the hole perforation plate. For example, the front surface may comprise a protrusion in the area of at least one arrangement of the holes, or the front surface may comprise one or more protrusion(s) in the area of each arrangement of the holes. In a preferred embodiment the one or more protrusion(s) in the front surface of the hole perforation plate is a/are central protrusion(s). Said central protrusion(s) may comprise the area of at least one hole and at most the area of all holes of the hole perforation plate which belong to one bristle tuft arrangement. In addition or alternatively, the one or more protrusion(s), in particular central protrusion(s) may cover at least 10% of the area of the front surface, preferably at least 15% of the area of the front surface, more preferred at least 20% of the front surface. The central protrusion may protrudes from about 0.2 mm to about 0.6 mm from the front surface, preferably from about 0.3 to about 0.5 mm from the front surface, more preferably from about 0.35 mm to about 0.45 mm from the front surface and even more preferred the central protrusion protrudes about 0.4 mm from the front surface.

According to the method as disclosed herein the hole perforation plate as disclosed herein comprises through-holes for bristle tuft generation, i.e. the holes are as long as the plate is thick and the bristle tufts can be relocated within the holes and with different distances to the front surface of the hole perforation plate. In addition, the hole perforation plate may also comprise blind holes, wherein the blind holes may be used for elastomeric cleaning elements.

A suitable thickness of the hole perforation plate may be in the range of 5 mm to 20 mm, preferably 6 mm to 14 mm. In addition, the hole perforation plate may comprise more than one layers, in particular wherein the more than one layer may consist of different materials. A suitable material for the first layer comprising the front surface is heat resistant and allows to form high precision holes, such as stainless steel. A suitable material for a second layer may be less heat resistant, such as plastic material. In addition, the hole perforation plate can also be combined with a stopper plate. Therefore, the back surface of the hole perforation plate is combinable with such a stopper plate, wherein the stopper plate may comprise a flat surface or may comprise protrusions corresponding in form and shape to the arrangements of holes. The stopper plate may be used for example, to arrange the bristle tufts orthogonally in the holes, in particular to change and/or relocate the position of the bristle tufts in the holes of the hole perforation plate during different process steps.

The at least one property of the at least two bristle tufts which is different according to the method as disclosed herein is selected from the size of the bristle tuft, the form of the bristle tuft, the position of the bristle tuft in the hole perforation plate and/or in the desired bristle field of the brush head to be produced, the material of the bristle filaments, the color of the bristle filaments, the diameter and/or cross-section of the bristle filaments, the shape of the bristle filaments, additives present in the bristle filaments or a combination thereof.

The term "bristle field" as used herein shall mean the arrangement of more than one, preferably a plurality of bristle tufts. Thereby, the term is used irrespectively from the location of the arrangement, e.g. a bristle field might be arranged in the hole perforation plate, in a mold bar, in a part of a brush head, in a brush head or in a toothbrush.

Bristle filaments may be for example monofilaments made from plastic material. Suitable plastic materials used for bristle filaments may be polyamide (PA), in particular nylon, polyamide 6.6, polyamide 6.10 or polyamide 6.12, polybutylene terephthalate (PBT), polyethylene terephthalate (PET) or mixtures thereof.

The circumference of the bristle filaments may be substantially round or the circumference may comprise one or more recesses, such as X-tape bristle filaments or may alter along the length axis of the bristle filament. The diameter of a round bristle filament may be in the range from about 4 mil (0.1016 mm) to about 9 mil (0.2286 mm), in particular in the range of about 4 mil (0.1016 mm) to about 7 mil (0.1778 mm), more particular in the range of about 5 mil (0.127 mm) to about 6 mil (0.1524 mm) or any other numerical range which is narrower and which falls within such broader numerical range, as if such narrower numerical ranges were all expressly written herein.

In addition, to the standard bristle filaments having the diameters as given above super-thin bristle filaments are used in toothbrushes. Super-thin bristle filaments have a smaller diameter compared to standard bristle filaments and may act like floss during normal brushing. The diameter of super-thin bristle filaments may be in the range from about 2 mil (0.0508 mm) to about 4 mil (0.1016 mm) or any other numerical range which is narrower and which falls within such broader numerical range, as if such narrower numerical ranges were all expressly written herein. Bristle filament diameters are produced with a tolerance of 10%.

In addition to bristle filaments with a substantially constant diameter also bristle filaments may be used which diameter decreases towards the ends. These kind of tapered bristle filaments are based on standard diameter bristle filaments which ends are chemically tapered. Suitable tapered bristle filaments are provided for example by BBC, Korea.

In addition, bristle filaments may be used which comprise an irregular diameter, i.e. which comprise at least one recess. A "recess" as understood herein in the bristle filament circumference, diameter, cross-section and/or volume shall mean any depression, cavity, slot or other geometric recess which amends the bristle filament volume. The bristle filament comprising at least one recess in its circumference may comprise one or more recesses along the circumference of the bristle filament. A suitable example for a bristle filament comprising at least one recess is an X-shaped bristle filament. X-shaped bristle filaments comprise four recesses and two lines of reflection symmetry each crossing two recesses which are located opposite to each other. In addition, all four recesses might be equal. The included angle of the X-shape bristle filaments might be in the range of from about 40° to about 160°.

Length of the bristle filaments depends on the intended use. Generally, a bristle filament can be of any suitable length for transporting, such as about 1300 mm and is then cut into pieces of the desired length. The length of a bristle filament in a toothbrush influences the bending forces needed to bend the bristle filament. Thus, the length of a bristle filament can be used to realize different stiffness of bristle filaments in a bristle field of a brush head. The typical length of a bristle filament for a brush, in particular a toothbrush, may be in the range from about 5 mm to about 20 mm, in particular in the range from about 6 mm to about 15 mm, more particular in the range of about 7 mm to about 12 mm or any other numerical range which is narrower and which falls within such broader numerical range, as if such narrower numerical ranges were all expressly written herein.

In addition, the bristle filament material may comprise additives such as abrasives, color pigments, flavors etc. in order to provide an indicator filament. An "indicator filament" as understood herein is any element which is amended over time and/or use thereby indicating the status of the toothbrush. For example, an indicator element may change or wear off its color over time and/or use. The coloring on the outside of the material is slowly worn away during use to indicate the extent to which the bristle filament is worn. Suitable additives to bristle filaments used for bristle tufts are for example UV-brighteners, signaling substances, such as the indicator color pigments and/or abrasives. For example, an abrasive such as kaolin clay may be added and/or the bristle filaments may be colored at the outer surface.

Several bristle filaments are grouped to form one bristle tuft. The term "bristle tuft" as used herein shall be understood as any shape, form, size and/or arrangement of bristle filaments of a predefined length. Any geometric shape, form or arrangement that can be produced by grouping individual bristle filaments can form a bristle tuft. Standard shapes that are given as an example are round bristle tufts, elliptic bristle tufts, sickle-shaped bristle tufts, bristle tuft stripes, or combinations thereof. A suitable number of filaments to form one bristle tuft may be for example in the range of about 10 to about 80 filaments, or in the range of about 15 to about 60 filaments, or in the range of about 20 to about 50 filaments, or any other numerical range which is narrower and which falls within such broader numerical range, as if such narrower numerical ranges were all expressly written herein.

After arranging the at least two bristle tufts in the hole perforation plate an energy source, in particular a thermal energy source is arranged in a predefined distance to the front surface of the hole perforation plate so that the ends of the at least two bristle tufts and the energy source are arranged contactless. In addition, the at least two bristle tufts are arranged in a fusing position, wherein the ends of the at least two bristle tufts which shall be fused are arranged in the hole perforation plate at different distances to the front surface resulting in different distances of the bristle tuft ends to the energy source, wherein the distance is adjusted according to the at least one property of the at least two bristle tufts. Due to said different distances the ends of the bristle tufts will melt equally although they provide at least one different property. The term "melt equally" as used herein shall mean that the fusing process of at least two different bristle tufts is standardized so that fuse balls of a similar form and shape are formed in the same fusing time.

After arranging the at least two bristle tufts in fusing position energy, in particular thermal energy is supplied from the energy source to the ends of the at least two bristle tufts until fuse balls are formed at the end of the at least two bristle tufts.

The bristle filaments of one bristle tuft are connected to each other at one end and form a fuse ball. The term "fuse ball" as used herein shall be understood as the molten filament material connecting the bristle filaments of one bristle tuft after the fusing process. A fuse ball can be of any shape or form including, but not limited to a plane, a plane with a depression, a plane with a concave surface, a plane with a convex surface, a mushroom head, a dome shaped head or a combination thereof. The size of a fuse ball is based on the requirements to be met. The two main requirements are to ensure that the tuft is securely connected into the brush head (tuft retention) and to combine the individual filaments securely to each other (filament retention) according to governmental regulations.

The formation of the fuse balls during the fusing process will be now described in more detail. The term "fusing process" as used herein shall be understood as the whole process of applying energy, in particular thermal energy from an energy source to the end of at least one bristle tuft in order to form a fuse ball at said bristle tuft end. A non-limiting example fusing process starts with applying energy to the end to be fused of said at least one bristle tuft. Thereby, the ends of the bristle filaments soften, whereby bristle filament ends of bristle filaments located at the outline of the bristle tuft soften faster than bristle filament ends of bristle filaments located in the middle of the bristle tuft. Without being limited by theory it is believed that the bristle filaments located in the middle of a bristle tuft are shielded against the energy applied by the energy source by the bristle filaments located at the outside of the bristle tuft. After softening bristle filament material melts and starts to flow along the bristle filament. Thereby the free spaces between the bristle filaments of one bristle tuft are filled with molten material. In addition, molten material flows down at the outline of the bristle tuft and the outline of the bristle tuft at the bristle tuft end increases so that a projection is formed by the fuse ball at the bristle tuft end. At this phase, the form of the fuse ball can be described as a plane with a central depression or a concave plane. If further thermal energy is applied more bristle tuft material melts and is combined with the fuse ball that has already been formed. Thereby, the form of the fuse ball changes and the molten material accumulates at the bristle tuft end forming a convex shaped plane. If further thermal energy is applied the material that flows down at the outline before will be also accumulated at the top of the bristle tuft end and a mushroom head or dome-shaped fuse ball will be finally built. The fusing process can be interrupted at any time, in particular at the time when the form and shape of the fuse ball meets the requirements of further use of the bristle tuft. The fusing process as described herein can be performed in horizontal or vertical arrangement of the hole perforation plate including the bristle tufts. Vertical arrangement might be preferred because vapors or steam which might be produced during the fusing process are able to move away and do not accumulate at the surface of the energy source. In addition, the energy source does not deform during fusing process.

According to the present disclosure it is preferred to fuse at least until the bristle tuft ends are molten sufficiently. The term "melt sufficiently" as used herein shall be understood as applying energy, preferably thermal energy to the bristle filament ends until the material of the bristle filaments softens and melts and the molten material forms any kind of fuse ball as defined above.

A preferred form of a fuse ball according to the present invention is a plane, a plane with a depression, in particular a plane with a central depression, a concave plane, a slightly convex plane, a convex plane or a combination thereof. Preferably the fuse ball has the form of a plane. Thereby the geometric outline of the plane is defined by the geometric outline of the bristle tuft which is defined and fixed by the geometric shape and form of the hole in the hole perforation plate. For example, round bristle tufts will form disc shaped planes, elliptic bristle tufts will form elliptic planes, sickle-shaped bristle tufts will form sickle-shaped planes and bristle tuft stripes will form planes in form of a stripe.

In addition, the preferred outline of the plane is larger than the outline of the bristle tuft so that the fuse ball forms a projection at the bristle tuft end. In particular, the ratio of the outline of the fuse ball of the bristle tuft to the outline of the bristle tuft is at least 1.05:1, preferably at least 1.1:1, more preferred at least 1.2:1, more preferred at least 1.3:1. In subsequent processes, such as molding of the brush head or a part thereof, said projection will form an undercut so that the bristle tuft is connected with the brush head or the part thereof securely.

The end of the bristle tuft that is opposite to the fuse ball represents the end to be intended to clean the teeth. The ends of the bristles that are intended to clean may be cut into a special profile, may be tapered, may be end-rounded and may be polished in order to provide a safe and comfortable bristle tuft, which does not hurt the soft tissue in the mouth.

According to the method as disclosed herein the distance between the energy source, in particular thermal energy source and the bristle tufts ends to be fused is adjusted according to the properties of the bristle tuft, such as the size of the bristle tuft, the form of the bristle tuft, the position of the bristle tuft in the hole perforation plate and/or in the desired bristle field of the brush head to be produced, the material of the bristle filaments, the cross-section and/or diameter of the bristle filaments, the shape of the bristle filaments, the color of the bristle filaments, additives present in the bristle filaments, or a combination thereof. All these properties influence the energy uptake, in particular the thermal energy uptake of the bristle tuft and thus influence the fusing process of each bristle tuft. Thus, the bristle tuft ends are arranged with different distances to the energy source in order to standardize the fusing process again.

A suitable distance from the energy source, e.g. the thermal energy source to the front surface of the hole perforation plate is in the range of from 0.5 mm to 1 mm, preferably in the range of from 0.5 mm to 4 mm. The bristle tufts protrude from the hole perforation plate and the more the bristle tuft protrudes from the hole perforation plate the smaller is the distance between the bristle tuft end to be fused and the energy source.

As disclosed herein the properties influence the melting of the bristle tufts and the formation of fuse balls. For example, the position of the bristle tuft in the hole perforation plate and/or in the desired bristle field of the brush head to be produced influences the fusing process. Without being bound by a theory it is believed that bristle tufts which are arranged at the periphery of a bristle field shield bristle tufts which are arranged in the middle of a bristle field. The more bristle tufts are arranged around a subject bristle tuft the more thermal energy is shielded. Thus, if all bristle tufts of a bristle field shall be fused in the same time and the fuse balls shall be similar, preferably substantially identically formed, the shielding effect can be equalized by reducing the distance between the bristle tuft ends and the energy source. For example, when a plurality of bristle tufts is arranged in the hole perforation plate in the fusing position the distance between the energy source and the bristle tuft ends of bristle tufts that are arranged in the middle of the plurality of bristle tufts is shorter than the distance between the energy source and the bristle tuft ends of bristle tufts that are arranged in the periphery of the plurality of bristle tufts, preferably the distance between the energy source and the bristle tuft end of the bristle tuft that is arranged most central in the plurality of bristle tuft is the shortest.

Similar effects also appear regarding the size of a bristle tuft or the form of a bristle tuft. In larger bristle tufts the central filaments are shielded against the energy during the fusing process. Said effect is further influenced by the form of the bristle tuft as the shielding effect is larger for round bristle tufts than for elongated stripe-shaped bristle tufts. Without being bound by a theory it is believed that the formation of a central depression in the plane during fuse ball formation is based on the shielding of the inner bristle filaments by the outer bristle filaments. Accordingly, larger bristle tufts and/or bristle tufts with a larger cross-section are arranged with a smaller distance to the energy source than smaller bristle tufts and/or bristle tufts with a smaller cross-section. The distance between the energy source and the bristle tuft ends of bristle tufts decreases with increasing cross-section of the bristle tuft in a fusing position according to the method as disclosed herein.

In addition or alternatively, the fusing process is also influenced by the properties of the bristle filaments, such as material, diameter, cross-section, shape, color, of the bristle filament or the presence of further additives in the bristle filament. For example, in a fusing position the distance between the energy source, in particular the thermal energy source and the bristle tuft ends is adjusted according to the material of the bristle tuft, wherein preferably the distance is larger for bristle tufts comprising bristle filaments made from polyamide (PA), in particular nylon, polyamide 6.6, polyamide 6.10, or polyamide 6.12, than for bristle tufts comprising filaments made of polybutylene terephthalate (PBT) or polyethylene terephthalate (PET).

In addition or alternatively, the fusing process is also slightly influenced by the color of the bristle filaments. For example, the distance between the energy source and the bristle tuft ends of bristle tufts comprising green bristle filaments may be chosen larger than the distance between the energy source and the bristle tuft ends of bristle tufts comprising filaments of any other color.

In addition or alternatively, the fusing process may also be influenced by the size, in particular by the diameter and/or cross-section of the bristle filaments. Without being bound by a theory it is believed that e.g. smaller bristle filaments melt faster than larger bristle filaments and/or X-shaped bristle filaments melt faster than round filaments. For example according to the method as disclosed herein, in a fusing position the distance between the energy source, in particular the thermal energy source and the bristle tuft ends of bristle tufts comprising bristle filaments with a smaller diameter and/or cross-section may be larger than the distance between the energy source and the bristle tuft ends of bristle tufts comprising bristle filaments with a larger diameter and/or cross-section, preferably wherein the distance may be decreased with increasing bristle filament diameter and/or cross-section, more preferred wherein the distance may be decreased from bristle filament diameter of about 2 mil (0.0508 mm) to about 9 mil (0.2286 mm). In addition or alternatively, in a fusing position the distance between the energy source and the bristle tuft ends of bristle tufts comprising bristle filaments with an X-shaped diameter may be larger than the distance between the energy source and the bristle tuft ends of bristle tufts comprising bristle filaments with a round diameter.

Another property which may influence the fusing process and thus may influence the fusing position of the bristle tufts is the presence or absence of additives in the bristle filaments. Additives may decelerate s and/or accelerate the fusing process by absorbing or reflecting the thermal energy using process. For example, in a fusing position the distance between the energy source, e.g. the thermal energy source and the bristle tuft ends comprising bristle filaments comprising an additive, e.g. clay or titanium dioxide is shorter than the distance between the energy source and the bristle tuft ends of bristle tufts comprising filaments without said additive.

The influences of all properties of the bristle tufts and bristle filaments as disclosed above may compensate each other or may intensify each other. For example, bristle tufts with a smaller cross-section that are located in the middle of a bristle field may undergo a similar fusing process than bristle tufts with a larger cross-section that are located at the outside of a bristle field. Thus, according to the method as disclosed herein all properties of a bristle tuft are considered by adjusting the distance of the end of said bristle tuft to the energy source. Preferably, the influence of some properties is assessed larger than the influence of other properties. In a preferred embodiment of the method as disclosed herein, the distance between the bristle tuft end and the energy source, e.g. the thermal energy source is adjusted according to the size and/or cross-section of the bristle tuft, the position of the bristle tuft in the bristle field or a combination thereof, more preferred the distance between the bristle tuft end and the energy source, e.g. the thermal energy source is adjusted according to the position of the bristle tuft in the bristle field.

Any suitable energy source that is capable of producing the required amount of energy can be used for the fusing process as disclosed herein. For example, a thermal energy source may be used, the thermal energy source is a heater, preferably a convection type heater, a thermal radiation type heater, an infra-red radiation lamp or the like. Alternatively, the heater may be a heating plate, more preferred wherein the heating plate is at least partly made of a conductive material for emitting thermal radiation when an electric current flow through the conductive material. Suitable heating sources are for example disclosed in WO2015/094991A1 which is incorporated herein by reference. For example, the thermal energy source may comprise a heating plate that is at least partly made of a conductive material for emitting thermal radiation when an electric current flow through the conductive material. Said heating plate may be structured such that at least two heating sectors each comprising conductive material are formed that are separated from each other by at least one separation sector arranged for emitting at least less thermal radiation then the heating sectors and that each heating sector has a heating surface on a heating side of the heating plate, where each of the heating surfaces has an area in a range of between about 0.25 mm$^2$ to about 250 mm$^2$, in particular wherein at least one of the heating surfaces has an area below 100 mm$^2$.

The heating surfaces can be heated to a degree that the thermal radiation is sufficient to melt the bristle tuft ends provided at a certain distance in an emission direction. The distance between the bristle tuft ends and the heating surfaces during the fusing process may lie in a range of from about 0.05 mm and about 5 mm, preferably in a range of from about 0.1 mm and about 2 mm and is adapted according to the properties of the bristle tuft as disclosed herein. The temperature of the heating surfaces may be in a range of about 500 degrees Celsius to about 800 degrees Celsius and the application time of thermal energy from the thermal energy source during fusing might be in the range from 1 to 15 sec, preferably from 2 to 12 sec, more preferred from 3 to 10 sec, more preferred from 4 to 8 sec, more preferred from 5 to 7 sec. A suitable flow of thermal energy (0) from the thermal energy source to the at least two bristle tuft ends located in the hole perforation plate wherein the Temperature in ° C. measured with emissivity 0.88 is in the range from 500° C. to 1000° C., preferably 600° C. to 900° C., more preferred from 650° C. to 850° C.

The heating surfaces of the heating sectors of the heating plate may be made of a conductive material having a higher resistance than the resistance of a conducting material forming the at least one separation sector at least partly bordering the heating sectors. For example, this may be a layer of conductive material at the location of the heating sectors that is thinner than the layer thickness of a conductive material forming at least partly the separation sector and/or this may be a higher resistivity conductive material used to realize the heating sectors in comparison to the conductive material forming at least partly the separation area. Sufficient thermal radiation will be emitted when a sufficient electric current is flowing through the heating sectors, i.e. electric currents of typically up to 200 Ampere. The layer thickness of the conductive material forming the heating sectors may be for example about or below 1.0 mm, in particular below 900 µm, below 800 µm, below 700 µm, below 600 µm, below 500 µm, below 400 µm, below 300 µm, below 200 µm, or below 100 µm, preferably in a range of 250 µm to 750 µm or in a range of about 400 µm to about 600 µm. The layer thickness of conductive material in the separation sector may be above 1.0 mm, in particular above 1.5 mm, above 2.0 mm, above 3.0 mm, above 4.0 mm, above 5.0 mm, or above 10 mm.

As a heating sector a structured portion of the heating plate is understood herein comprising conductive material, which structured portion has a heating surface on the heating side of the heating plate that tends to emit a higher amount of thermal radiation than surface areas of the separation sector that at least partly borders the respective at least two heating sectors, in particular as the heating sector comprises conductive material having a higher resistance than conductive material in adjacent (i.e. bordering) areas of the heating plate or because the heating sector is embedded in an isolating material.

Electrical resistivity ρ (also known as resistivity, specific electrical resistance, or volume resistivity) quantifies how strongly a given material opposes the flow of electric current. A low resistivity indicates a material that readily allows the movement of electric charge. For example, 18% chromium/8% nickel austenitic stainless steel has a resistivity of $\rho_{steel}=6.9 \cdot 10^{-7}$ Ωm, copper of $\rho_{copper}=1.68 \cdot 10^{-8}$ Ωm, PET (polyethylene terephthalate) of $\rho_{PET}=1.0 \cdot 10^{21}$ Ωm (all values given for a temperature of 20° Celsius). Resistivity is a material property. The resistance R of a piece of resistive material having a length l and a cross sectional area A against flow of electric current between its both ends in length direction is given by R=ρ·l/A. Thus, the resistance of a uniform piece of material of given length can be increased by reducing its cross-sectional area, as is generally known.

Perfect isolator materials do not exist, however "conductive material" shall mean a material having a resistivity below ρ=1.0 Ωm (in particular, this limit may be set to below $\rho=1.0 \cdot 10^{-1}$ Ωm) and "isolating material" shall mean a material having a resistivity above ρ=1.0 Ωm (in particular, this limit may be set to above $\rho=1.0 \cdot 10^{3}$ Ωm). Metals (allowing free electron flow) such as steel, copper, silver, gold, iron and metal alloys etc. are good conducting materials. Other conducting materials include amorphous carbon, conductive ceramics such as ITO and conductive polymers such as PEDOT:PSS. Conductive materials that are in particular suitable within the scope of the present disclosure are those conductors that are thermally stable at the above-mentioned temperatures of about 500 degrees Celsius to about 800 degrees Celsius.

Many metals such as steel, copper, aluminum, silver, many metal alloys including iron-based alloys or copper-based alloys such as brass, bronze or Beryllium copper (ASTM B194, B196, B197) etc. are thermally stable (i.e. do not notably deform or melt or otherwise degrade so that the material is usable for an industrially sensible period) within the meaning of the present disclosure. Good isolator materials are glass, paper, dry wood, Teflon, PET, hard rubber, rubberlike polymers, isolating ceramics such as aluminum oxide or steatite and many plastics etc.

The passage of electric current through a conductor releases thermal energy by a process known as resistive heating (or ohmic heating or Joule heating). Said resistive heating leads to emission of thermal radiation, in particular infrared radiation that is absorbed by the ends of the filaments in a sufficient amount so that the thermoplastic material of the exposed ends of the bristle tufts melts and the molten material forms a fuse ball structure as is has been discussed in detail before. Fusing of bristle tufts ends as disclosed herein can be performed horizontally (i.e. the tufts are arranged essentially parallel to the direction of earth gravity) but as well as vertically (i.e. where the tufts are substantially inclined against the direction of earth gravity, in particular where the tufts are arranged essentially perpendicular to the direction of earth gravity). Vertical fusing will be in particular possible, if the applied thermal energy is adapted to the individual properties of the bristle tufts as disclosed herein. The molten bristle tuft ends melt very fast and also solidify very fast when the source of thermal radiation is moved away so that essentially no "noses" of dripping plastic melt is generated. Fusing technologies applying more thermal energy than those needed for the formation of the fuse ball heat up for example the whole environment such that at least generation of the mentioned noses during vertical fusing can hardly be avoided. Due to the defined heating of the bristle tuft ends as disclosed herein the volume of material that is molten is lower than in the normal fusing process and the surface tension of the molten material is thus higher and effectively reduces the generation of noses or even dripping material. In addition, the heating process can be further cost optimized by using different heating sectors, so that the heating surfaces selectively emit different amounts of thermal radiation during operation of the device. The area of the heating surface of each of the heating sectors may lie in a range of about 0.25 mm² and about 250 mm², in particular in a range of about 0.5 mm² and about 100 mm², where further in particular the upper limit may be smaller, such as about 90 mm², 80 mm², 70 mm², 60 mm², 50 mm², 40 mm², 30 mm², 20 mm², 10 mm², 5 mm², 4 mm², 3 mm², or 2 mm². A typical cylindrical tuft as used in many of today's toothbrushes may has a diameter in the range of between about 0.5 mm to about 2.5 mm, in particular in the range of between about 1.0 mm to about 2.0 mm, further in particular in the range of between about 1.3 mm to about 1.8 mm. As an example, a circular tuft having a diameter of 1 mm has an area of about 0.785 mm². Some toothbrushes comprise large sized single tufts such as the Oral-B CrossAction® toothbrush, which has a large size single bristle tuft at its foremost end having an area of about 28 mm² (30 mm² may then be considered as an appropriate upper limit). Obviously, even larger single bristle tufts can be contemplated (50 mm² may then be considered an appropriate upper limit). The individual bristle tufts are each arranged with a distance to each other, as otherwise they would form a single tuft with densely arranged filaments. The bristle tufts are arranged with a distance to allow the free filament ends of the final toothbrush to move when applied with a force against a tooth surface. Typical distance between neighboring tufts of a tuft field of a toothbrush may lie in a range of about 0.2 mm to about 5.0 mm, in particular in a range of about 0.5 mm and about 2.0 mm. In some of today's toothbrushes a distance between neighboring tufts of about 0.8 mm to about 1.6 mm is employed.

Higher thermal emission of the heating surfaces may be achieved by a different average profile roughness Ra on the heating surfaces than on the bordering surfaces made of conductive material of the separation sectors. Typical values for the average profile roughness of the heating surfaces are Ra≥20 µm, in particular Ra≥25 µm (an upper limit of Ra≤200 µm, in particular of Ra≤200 µm and further in particular of Ra≤50 µm may be employed). Typical values for the average profile roughness of the surface of the separation sector(s) are Ra≤10 µm, in particular Ra≤5 µm, further in particular Ra≤2.0 µm. Typical polished surfaces have an average profile roughness of Ra≤1.0 µm (where finish grinding results in an average profile roughness of Ra≤0.2 µm).

The heating surface may be a non-flat surface, e.g. may be concavely formed so that the thermal radiation will be more focused than with a flat heating surface. Generally, the heating plate may be made from sintered, in particular laser sintered material, in particular conductive material, even though the heating plate may also comprise isolating material.

After formation of the fuse balls the at least two bristle tufts are transferred to a subsequent process position, wherein in the subsequent process position the distance of the bottom edge of the fuse ball of at least one bristle tuft to the front surface of the hole perforation plate is different to the distance of the bottom edge of said fuse ball of said bristle tuft to the front surface of the hole perforation plate in the fusing position, wherein the subsequent process position might be e.g. the molding position. Preferably, the distance between the bottom edge of the fuse ball and the front surface of the hole perforation plate of at least one bristle tuft in the fusing position is larger or shorter, preferably larger than the distance between the bottom edge of the fuse ball and the front surface of the hole perforation plate of said at least one bristle tuft in the subsequent process position. The term "bottom edge of a fuse ball" as used herein shall be understood as the position at the bristle filaments in a bristle tuft where the amendment of the bristle filament material caused by the energy, in particular thermal energy applied during the fusing process, i.e. softening or melting of the material of the bristle filament, ends.

That means after the fusing process the position of the bristle tufts in the hole perforation plate may be amended again, wherein the position of the bristle tufts is adjusted to the requirements of the subsequent processes. For example, the distance between the bottom edge of the fuse ball and the front surface of the hole perforation plate of at least one bristle tuft in the fusing position is larger or shorter, than the distance between the bottom edge of said fuse ball and the front surface of the hole perforation plate of said at least one bristle tuft in the subsequent process position. For example, the subsequent process might be the over-molding of the fuse balls to form a brush head at least partially. If the subsequent process position is adjusted according to the molding process a larger distance between the bottom edge of the fuse ball and the front surface of the hole perforation plate might be advantages in order to have more material flowing around the fuse ball and fixing the bristle tuft more tightly in the brush head to be formed. In addition or alternatively, a smaller distance between the bottom edge of the fuse ball and the front surface of the hole perforation plate might be advantages in order to produce small brush heads and/or to generate free space in the brush head above the fuse balls. Said free space may be needed to include other features of a brush head, such as elastomeric cleaning elements, or gearing or coupling elements which are needed for brush heads of electric toothbrushes. A suitable distance between the bottom edge of the bristle tuft end and the front surface of the hole perforation plate of the at least two bristle tufts in the molding position is in the range from 0.2 to 3 mm, preferably from 0.3 to 2.5 mm, more preferred from 0.4 to 2 mm, more preferred from 0.5 to 1.5 mm, more preferred from 0.6 to 1.2 mm.

Other subsequent process steps, such as reviewing or checking steps and/or molding steps, that provide elastomeric cleaning elements into the perforation plate may be included optionally in the method as disclosed herein. Suitable reviewing or checking steps may include checking and confirming the correct number, diameter and/or color of filaments in the individual hole of the perforation plate; checking and confirming correct position of bristle tufts and/or elastomeric elements in the holes of the perforation plate; checking the presence and quality of the fuse ball of a bristle tufts, and/or combinations thereof. The quality check of a fuse ball may comprise dislocating the fuse ball from the perforation plate in order to visually inspect the fuse ball by top, down and side views for checking form and size of the fuse ball and whether all filaments are included completely. Finally, the bristle tufts are arranged in the molding position, wherein the distance between the bottom edge of the fuse ball and the front surface of the hole perforation plate is adjusted according to the requirements of the subsequent molding process, where according to the method as disclosed herein said molding position of at least one bristle tuft differs from the fusing position of said bristle tuft.

After the bristle tufts are arranged in the molding position the fuse balls of the at least two bristle tufts are over-molded with plastic material, whereby a brush head or the part thereof is formed. Therefore, a mold is formed, wherein the hole perforation plate forms one part of the mold. The mold is formed in such that the fuse balls are located in the hollow formed by the mold without having contact to any of the inner surfaces of the mold so that the fuse balls can be embedded into the material to be injected completely when the brush head or the part thereof is formed. Suitable materials for forming the brush head or the part thereof are hard plastic materials. The Shore D hardness of the "hard plastic" material as understood herein may be in the range from about 30 to about 90, in particular in the range from about 40 to about 80, more particular in the range from about 50 to about 80, even more particular in the range from about 65 to about 75. Suitable materials which may be used as hard plastic material may be for example polypropylene (PP), polyethylene (PE), polyoxymethylene (POM), polyethylene terephthalate (PET), a polyamide (PA), or a blend or a mixture comprising polypropylene (PP), polyethylene (PE), polyoxymethylene (POM), polyethylene terephthalate (PET) or a polyamide (PA).

The brush head may comprise further elements, such as chemical releasing elements or elastomeric elements. A "chemical releasing element" as understood herein is any element which releases chemical substances during use, in contact with water and/or saliva and/or after mechanical influence by the bristle filaments during brushing. Suitable chemical releasing elements are for example pads or reservoirs which are filled with or comprise chemical actives. Suitable chemical actives which might be released may be for example, anti-sensitivity chemicals, pain-relief chemicals, wound-healing chemicals, anti-inflammation chemicals, flavoring components, anti-tartar chemicals, whitening chemicals, anti-bacterials, anti-erosion chemicals or a mixture thereof.

An "elastomeric element" as understood herein is any cleaning element that is not a bristle filament or a bristle tuft. Elastomeric elements may be formed e.g. from soft plastic material. The Shore A hardness of "soft plastic" material as understood herein may be in the range from about 10 to about 80, in particular in the range from about 20 to about 70, more particular in the range from about 30 to about 60, even more particular from about 30 to about 40. The Shore A hardness of the soft plastic material is adapted to the geometry used for the elastomeric element Thinner geometric elements may be produced from a material having a greater Shore A hardness compared to thicker elements and vice versa. The choice of the soft plastic material also depends on the length of the element formed. In principle, longer geometric elements may be manufactured from a soft plastic material having a greater Shore A hardness compared to shorter elements. Suitable materials which may be used as soft plastic material may be for example rubber, thermoplastic elastomer (TPE), polyethylene (PE), polypropylene (PP), Polyoxymethylene (POM) or a blend or a mixture thereof. Materials which show elastomeric properties, such as TPE, are preferably used as soft plastic materials herein. The soft plastic material may have any geometric form, for example, a nub, a pin, a fin, a wall, a bar, a gutter, a curve, a circle, a lamella, a textured element, a polishing element such as, for example, a polishing cup, or a tongue cleaning element or a combination thereof.

The elastomeric element may be produced before and/or may be provided together with bristle tuft(s) and may be over-molded with the material used to form the brush head or a part thereof. In addition or alternatively, the brush head or the part thereof may comprise holes which are filed with elastomeric material in a subsequent process step in order to form elastomeric elements. Preferably, elastomeric elements that are included into a bristle field are produced and/or provided before and/or together with the bristle tufts. In addition or alternatively, elastomeric elements that are positioned at the outline and/or at the backside of a brush head, e.g. elements intended to clean the gum line or the tongue are preferably produced and/or provided after the bristle field. Independently from the process step used, a physical connection is built between the elastomeric element and the brush head. The toothbrush may be for example a manual toothbrush or a replacement brush for an electrical toothbrush comprising a brush head as disclosed herein providing one or more cleaning element(s), a handle and a neck connecting the brush head and the handle to each other, wherein the one or more cleaning element(s) may comprise one or more elastomeric elements and one or more bristle tuft(s). The method disclosed herein allows high design flexibility and makes handling of non-bristle-tuft-cleaning elements as easy as bristle-tuft cleaning elements. Handling of elastomeric elements is usually challenging due to the fact that the elastomeric elements are difficult to grip, could be strongly influenced by electrostatic forces and are difficult to handle due to their elastomeric properties. Theses handling problems are decreased, if elastomeric elements are directly formed in the hole perforation plate. By the methods disclosed herein bristle tuft cleaning elements and elastomeric elements are handled in a similar manner thereby making toothbrush manufacturing more efficient. In addition or alternatively, the present method may also ease handling of advanced filament types, such as super-thin filaments which are tapered chemically or mechanically in anchor-free manufacturing techniques.

After the intended cleaning elements are all placed in the hole perforation plate a mold cavity is formed comprising the hole perforation plate as the first mold half and at least one second mold half. Then a plastic material which shall form the brush head or a part thereof is injected into the mold cavity. Thereby the fuse balls of the one or more bristle tuft(s) and the optional elastomeric element are over-molded with the molten plastic material. Thereby, the fuse balls are embedded into the plastic material and undercuts are formed so that the bristle tufts are secured against pulling forces. For example, the molten material of the cleaning element carrier may flow around the tuft ends of the bristle tufts forming small balls or plates or any geometric protrusion of the elastomeric element may be embedded into the molten material forming the brush head or a part thereof. Preferably, the part that is formed from the molten material is a cleaning element carrier. The cleaning element carrier comprises a front surface, a back surface and a thickness, wherein the cleaning element carrier is at least thick enough to embed the one or more fuse ball(s) completely in the cleaning element carrier. A suitable thickness of the cleaning element carrier may be in the range of from about from 2.0 mm to 4.0 mm, preferably in the range of from 2.2 mm to 4.0 mm, more preferably in the range of from 2.5 mm to 3.5 mm. The bristle filaments protrude from the front surface of the cleaning element carrier and at least two fuse balls are preferably located at different levels in the cleaning element carrier. The cleaning element carrier might be manufactured from any suitable plastic material, in particular from any plastic material which can be processed in a molten state. Suitable material comprises polyethylene (PE), polypropylene (PP), Polyoxymethylene (POM), thermoplastic elastomers (TPE) or a blend or a mixture thereof, wherein the different materials show different advantages and are chosen accordingly. For example polyoxymethylene is a harder material showing a higher resistance during use, but is more difficult to process during injection molding; in contrast, polypropylene is less hard and resistant, but also less expensive and easier to process during injection molding. In the present invention the material of the cleaning element carrier is preferably made from polypropylene.

The cleaning element carrier may further comprise an edge at the periphery of the back surface. That means, the cleaning element carrier may further comprise a central depression in the back surface, preferably a central depression in the range of from 0.1 mm to 3 mm, more preferred in the range on from 0.5 mm to 2.5 mm, more preferred in the range of from 1 mm to 2 mm, more preferred in the range of from 1.5 to 1.8 mm. The central depression may cover at least 70% of the area of the back surface, preferably at least 80% of the area of the back surface, more preferred at least 85% of the area of the back surface, more preferred at least 90% of the area of the back surface, more preferred from 90% to 98% of the area of the back surface. For example, a drive part might be located in the first central depression. In addition, the cleaning element carrier may further comprise a second central depression, in the back surface, wherein the optional second central depression is preferably in the range of from 0.1 mm to 2 mm, more preferred in the range on from 0.1 mm to 1.6 mm, more preferred in the range of from 0.2 mm to 0.8 mm. The second depression(s), in particular the second central depression(s) may cover at least 30% of the area of the first depression, preferably at least 40% of the area of the first depression, more preferred from 40% to 50% of the area of the first depression. For example, distribution channels or a soft plastic material layer for soft plastic cleaning elements might be located in the second central depression.

In addition or alternatively, a cover might be located inside the edge and might cover the depressions of the cleaning element carrier, wherein the surface of the cover forms preferably a planar surface with the edge of the cleaning element carrier. The cover may be produced separately or might be formed directly onto the cleaning element carrier, e.g. by injection molding. For example, the material of the cover might comprise polyethylene (PE), polypropylene (PP), polyoxymethylene (POM), thermoplastic elastomers (TPE) or a blend or a mixture thereof. The material might be molten and might be injected directly onto the cleaning element carrier. Preferably the material of the cover might be identical to the material that is used for the cleaning element carrier. If both materials are identical an optimal bond between the cleaning element carrier and the cover is achieved. Preferably, polypropylene (PP) is used as material of the cover. In an alternatively preferred embodiment, the elastomeric cleaning elements and the cover are made from the same material, in particular are made from thermoplastic elastomers (TPE). The color of the material of the cover might be identical or different to the color of the material of the cleaning element carrier.

In addition or alternatively, the cleaning element carrier might comprise one or more slots, which are suitable to receive one or more elastomeric elements. The slots might be of any geometrical form and shape and the form and shape of the one or more slot(s) might be adapted according to the form and shape of the elastomeric elements. If more elastomeric elements are included into the cleaning element carrier, the elastomeric elements may be identical to each other or may differ in form and shape. If more elastomeric elements made from the same material are included into the cleaning element carrier the back surface of the cleaning element carrier might comprise distribution channels which connect the one or more slot(s) to each other so that the elastomeric material can be distributed over the cleaning element carrier and all elastomeric elements can be produced in one process step. That means that the elastomeric elements are connected to each other via elastomeric material located in the distribution channels. In contrast, different elastomeric elements can be produced independently from each other. Suitable material which can be used for the elastomeric elements comprise rubber, thermoplastic elastomer (TPE), or a blend of mixture thereof, preferably used are thermoplastic elastomer (TPE) materials.

The cleaning element carrier comprising the bristle tufts and the optional elastomeric elements represents the central part, namely the cleaning part of a toothbrush head. The cleaning element carrier might be included into a toothbrush head of a replacement brush head for an electric toothbrush or might be included into a toothbrush head of a manual toothbrush. For example, the cleaning element carrier might be placed into a mold and might be over-molded with molten plastic material thereby forming the toothbrush, a replacement brush head for an electrical toothbrush or a part thereof. That means, brush heads, in particular toothbrush heads or parts thereof, as well as toothbrushes comprising said brush heads or parts thereof which are preferably produced by the method as disclosed herein can be used for manufacturing any kind of manual toothbrush or any kind of replacement brush for electric toothbrushes. Thus, the present disclosure further provides a brush, in particular a toothbrush comprising a cleaning element carrier providing cleaning elements as disclosed herein.

In the following, a detailed description of several example embodiments will be given. It is noted that all features described in the present disclosure, whether they are disclosed in the previous description of more general embodiments or in the following description of example embodiments of the devices or the method, even though they may be described in the context of a particular embodiment, are of course meant to be disclosed as individual features that can be combined with all other disclosed features as long as this would not contradict the gist and scope of the present disclosure. In particular, all features disclosed for either one of the devices or a part thereof or disclosed together with the method may also be combined with and/or applied to the other parts of the devices or a part thereof, if applicable and vice versa.

FIG. 1A shows an example embodiment of a cleaning element carrier 30. The cleaning element carrier 30 comprises a front surface 31, a back surface 32 and a thickness T. A suitable thickness of a cleaning element carrier 30 as disclosed herein is in the range from 2.5 mm to 3.5 mm. The cleaning element carrier 30 shown is a disc, but non-round shapes are also possible. The cleaning element carrier 30 comprises at least one protrusion 37, wherein the protrusion 37 is located centrally at the front surface 31. The central protrusion 37 covers at least 10% of the whole front surface 31, preferably 15%, more preferred 20% of the whole front surface 31. The size of the central protrusion 37 in % of the whole front surface 31 depends on the tuft design. The central protrusion 37 protrudes about 0.4 mm from the front surface 31. The central protrusion 37 preferably ends between two tufts, but in certain embodiments the central protrusion 37 may also end within one or more tufts.

Figure 1B:
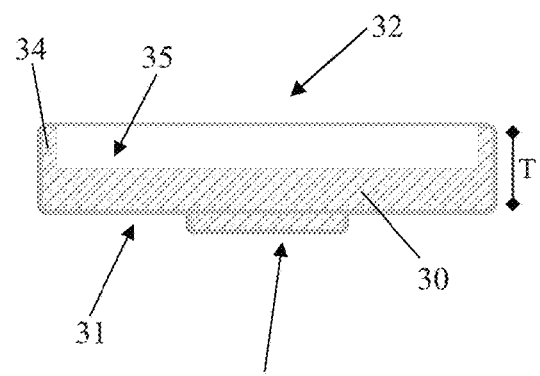
FIG. 1B shows a cross-sectional view of an example embodiment of a cleaning element carrier having a central protrusion and a central depression.

FIG. 1B shows another example embodiment of a cleaning element carrier 30 comprising a front surface 31, a back surface 32 and a thickness T. A suitable thickness of a cleaning element carrier 30 as disclosed herein is in the range from 2.5 mm to 3.5 mm. The cleaning element carrier 30 comprises at least one protrusion 37, which is located centrally at the front surface 31 and a central depression at the back surface 32. The central depression 35 covers at least 70% of the back surface 32 so that an edge 34 is formed in the periphery. The edge 34 may be about 0.6 mm to 1.2 mm thick, but smaller edges may be also possible as long as an edge is formed which is stable during manufacturing process. The central protrusion 37 covers at least 10% of the whole front surface 31, preferably 15%, more preferred 20% of the whole front surface 31.

Figure 1C:
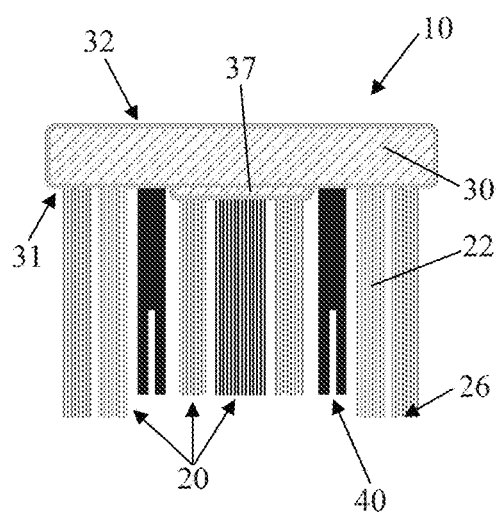
FIG. 1C shows a side view of an example embodiment of a cleaning element carrier having a central protrusion comprising bristle tufts.

FIG. 1C shows an example embodiment of a part 10 of a brush head. The part 10 shown in side view comprises a cleaning element carrier 30 with a front surface 31 and a back surface 32 and several bristle tufts 20. Seven bristle tufts 20 can be seen, wherein each bristle tuft 20 comprises several filaments 22. The bristle tufts 20 protrude from the front surface 31 of the cleaning element carrier 30 and the ends 26 of the filaments 22 that are intended for cleaning are end-rounded in order to ensure a save use. At the opposite end of the filaments 22 a fuse ball (not shown) is formed which is embedded into the cleaning element carrier 30. The part 10 of a brush head further comprises two elastomeric cleaning elements 40 made from a thermoplastic elastomer (TPE).

Figure 1D:
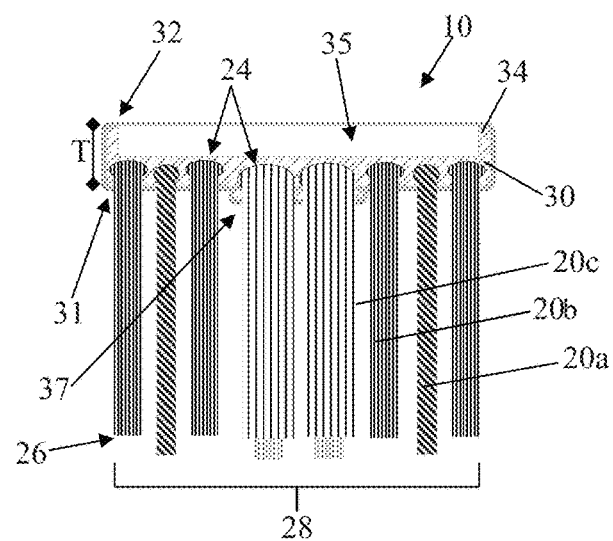
FIG. 1D shows a cross-sectional view of an example embodiment of a cleaning element carrier having a central protrusion and a central depression comprising bristle tufts arranged on a bristle field.

FIG. 1D shows a cross-sectional view of another example embodiment of a part 10 of a brush head comprising a cleaning element carrier 30 with several bristle tufts 20 forming a bristle field 28. Three different types of bristle tufts 20 are shown (20a, 20b, 20c) which can differ in number, color, length and/or material of the individual filaments. The bristle tufts 20c is a tuft-in-tuft embodiment, wherein the inner central tuft protrudes from the peripheral tuft. The cleaning element carrier 30 comprises at least one protrusion 37, which is located centrally at the front surface 31 and a central depression at the back surface 32. The bristle tufts 20 protrude from the front surface 31 of the cleaning element carrier 30 and the ends 26 of the filaments forming the bristle tufts 20 that are intended for cleaning are end-rounded in order to ensure a save use. At the opposite end of the bristle tufts 20 a fuse ball 24 is formed which is securely embedded into the cleaning element carrier 30. The back surface 32 of the cleaning element carrier 30 comprises a central depression 35, wherein the central depression 35 covers at least 70% of the back surface 32 so that an edge 34 is formed in the periphery. The edge 34 may be about 0.6 mm thick, but smaller edges may be also possible as long as an edge is formed which is stable during manufacturing process. The front surface 31 comprises a central protrusion 37, wherein the area of the cleaning element carrier covered by the protrusion 37 is smaller than the area of the cleaning element carrier covered by the depression 35 so that the protrusion 37 is not recognizable by the user of the brush head. The protrusion 37 may cover at least 10% of the front surface 31 and may be helpful to increase the thickness T of the cleaning element carrier 30 locally. A standard thickness T of the cleaning element carrier 30 in the periphery is in the range from 2.5 mm to 3.5 mm, wherein the central depression 35 may decrease the thickness by about 1.5 mm. Thus, it might be advantageous to increase the thickness T again by a protrusion 37 at the front surface 31. An increase of the thickness T by a protrusion 37 might be about 0.4 mm and might help to securely embedded the bristle tufts 20 in the middle of the cleaning element carrier 30.

Figure 2A:
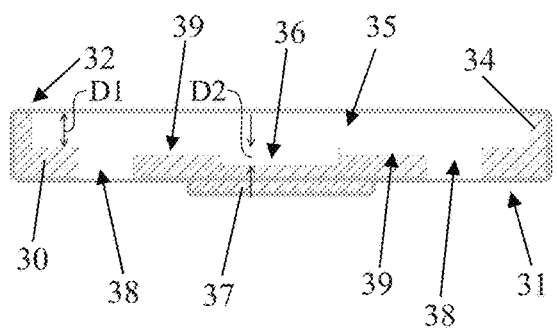
FIG. 2A shows a cross-sectional view of an example embodiment of a cleaning element carrier comprising voids.
Figure 2B:
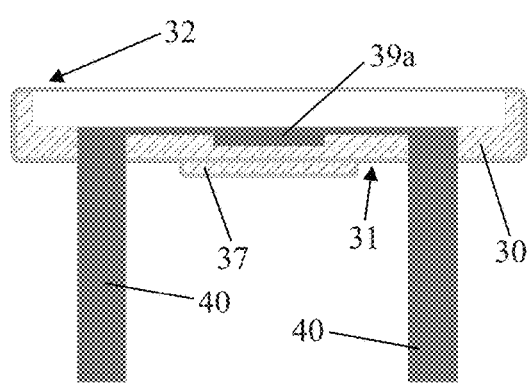
FIG. 2B shows a cross-sectional view of the example embodiment of the cleaning element shown in FIG. 2A, wherein the voids are filled with elastomeric cleaning elements.

FIG. 2A shows a cross-sectional view of an example embodiment of a cleaning element carrier 30 comprising voids 38 which can be filled with cleaning elements. The front surface 31 of the cleaning element carrier 30 comprises a central protrusion 37 which covers at least 20% of the front surface 31. The back surface 32 of the cleaning element carrier 30 comprises a first central depression 35 which covers at least 70% of the back surface 32 so that an edge 34 is formed in the periphery. In the middle of the first central depression 35 a second central depression 36 is shown which covers about 10% of the back surface 32. The cleaning element carrier 30 shown in FIG. 2A is a disc, but non-round shapes are also possible. The back surface 32 further comprises a network of grooves 39 that are connected to each other and which are located in the area of the depression 35. The grooves 39 may form any network that is suitable to connect the voids 38 so that at each end of the grooves 39 a void 38 is located in the cleaning element carrier 30 which can be filled with cleaning elements. FIG. 2B shows the cleaning element carrier 30 shown in FIG. 2A, wherein the voids 38 are filled with elastomeric cleaning elements 40. The elastomeric material for the elastomeric cleaning elements 40 was added into the grooves 39 and distributed over the network so that an elastomeric connection 39a is formed therein and all elastomeric cleaning elements 40 are formed together. Thus, the elastomeric cleaning elements 40 are connected to each other via the elastomeric connection 39a at the back surface 32 of the cleaning element carrier 30. As is shown in the embodiment of FIG. 2A, the first central depression (35) has a first depth (D1) extending from the back surface towards the front surface and terminating intermediate (or within) the thickness (T). A second central depression (36) is located at the back surface (32) and has a second depth (D2) extending from the termination of the first depth (D1). The second depression 36 also terminates intermediate the thickness (T), and the second depth (D2) is less than the first depth (D1).

Figure 2C:
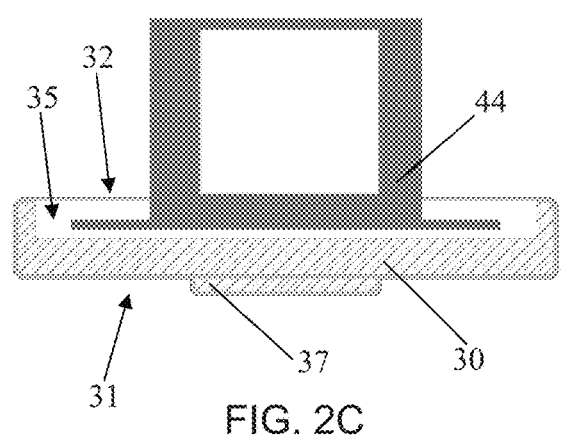
FIG. 2C shows a cross-sectional view of an example embodiment of a cleaning element carrier comprising a drive part at the back surface.
Figure 2D:
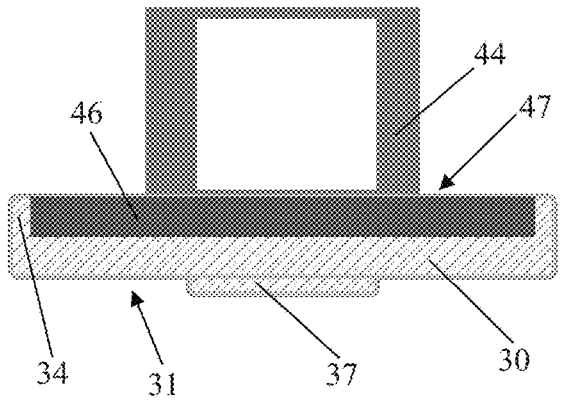
FIG. 2D shows a cross-sectional view of the example embodiment of a cleaning element shown in FIG. 2C, wherein the drive part is securely connected to the carrier by a cover.
Figure 2E:
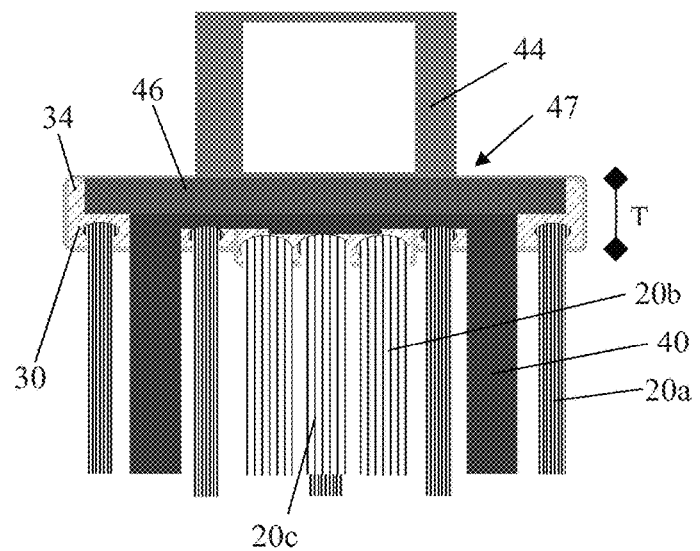
FIG. 2E shows a cross-sectional view of an example embodiment of a cleaning element carrier comprising a drive part, elastomeric cleaning elements, and bristle tufts.

FIG. 2C shows a cross-sectional view of the example embodiment of a cleaning element carrier 30 comprising a central depression 35 at the back surface 32 and a central protrusion 37 at the front surface 31. A drive part 44 is placed in the central depression. FIG. 2D shows a cross-sectional view of the example embodiment already shown in FIG. 2C, wherein the drive part 44 is mounted to the cleaning element carrier 30 with a cover 46. The cover 46 is located inside the central depression 35, wherein the back surface 47 of the cover 46 forms a planar surface with the edge 34. The material of the cover 46 is selected from polyethylene (PE), polypropylene (PP), Polyoxymethylene (POM) or a blend or a mixture thereof, preferably the material of the cover 46 is identical to the material of the cleaning element carrier 30 and the cover 46 is formed by injection molding directly into the depression 35 of the cleaning element carrier 30. Thus, the cover 46 and the cleaning element carrier 30 are connected to each other and the drive part 44 is securely mounted. The color of the cover 46 is preferably different from the color of the cleaning element carrier 30.

FIG. 2C shows a cross-sectional view of the example embodiment of a cleaning element carrier 30 comprising a central depression 35 at the back surface 32 and a central protrusion 37 at the front surface 31. A standard thickness T of the cleaning element carrier 30 in the periphery is in the range from 2.5 mm to 3.5 mm, wherein the central depression 35 decreases the thickness by about 1.5 mm. A drive part 44 is placed in the central depression and covered with a cover 46. The cover 46 is located inside the central depression 35, wherein the back surface 47 of the cover 46 forms a planar surface with the edge 34. The cover 46 is preferably made of the same material than the cleaning element carrier 30 and the cover 46 is formed by injection molding directly into the depression 35 of the cleaning element carrier 30. Several bristle tufts 20 and elastomeric cleaning elements 40 protrude from the front surface 31 of the cleaning element carrier. Seven bristle tufts 20 can be seen, wherein each bristle tuft 20 differs in at least one property from the other bristle tufts 20. For example bristle tufts 20a and 20b differ in the position of the bristle tuft 20 in the cleaning element carrier 30. The central bristle tufts 20c comprise more bristle filaments and is a tuft-in-tuft embodiment comprising an inner tuft that protrudes from the peripheral tuft. In addition the bristle filaments of the bristle tufts 20a, 20b, 20c may further differ regarding material, color or size of the bristle tuft. The elastomeric cleaning elements 40 are made from a thermoplastic elastomer (TPE).

Figure 3A:
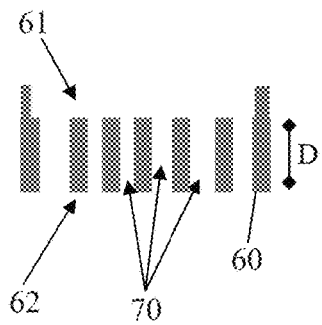
FIG. 3A shows a cross-sectional view of a hole perforation plate comprising a plurality of holes distributed in the hole perforation plate.
Figure 3B:
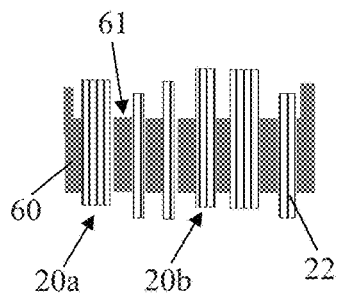
FIG. 3B shows a cross-sectional view of the hole perforation plate shown on FIG. 3a, wherein bristle tufts are placed in the plurality of holes.

FIGS. 3A-33I show a schematic method which can be used to produce the cleaning element carrier 30 as disclosed herein. FIG. 3A shows a hole perforation plate 60 which comprises a front surface 61, a back surface 62, a thickness D and a plurality of holes 70, wherein the plurality of holes 70 is shaped and distributed in the hole perforation plate 60 according to the desired bristle field 28 of the brush head to be produced. The thickness D is adapted to the length of the bristle tufts 20 which shall be placed in the holes 70 (FIG. 3B). Thus, the hole perforation plate 60 is thick enough that the filaments 22 of the bristle tufts 20 are stabilized and protected during the manufacturing steps, but thin enough that the bristle tufts 20 can still be handled. A suitable thickness D for the hole perforation plate 60 is from 6 mm to 14 mm The holes 70 are adapted to size and shape of the bristle tufts 20 that shall be placed therein. For example, bristle tuft 20a is larger than bristle tuft 20b, thus the holes 70 are different accordingly.

Figure 3C:
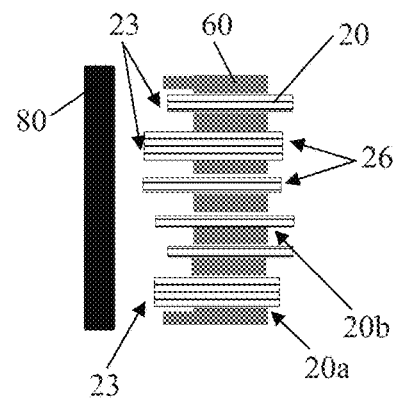
FIG. 3C shows the hole perforation plate, shown in FIGS. 3A and 3B, rotated by 90 degrees, and an energy source for fusing the bristle tufts' ends.
Figure 3D:
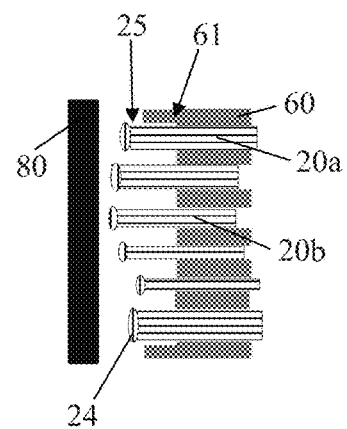
FIG. 3D shows the hole perforation plate, shown in FIGS. 3A-3C, wherein thermal energy is applied the melt the tufts' ends and form fuse balls thereof.

In FIG. 3C the hole perforation plate 60 was rotated by 90°. The bristle tufts 20 protrude from the hole perforation plate 60 at both sides. One end 26 of the bristle tufts 20 is intended for cleaning and thus, is end-rounded and comprises a smooth surface. The opposite end 23 of the bristle tufts 20 is intended for fusing. The fusing of the ends 23 is performed with a thermal energy source 80 which is approached to the ends 23. Due to the different properties of the bristle tufts 20a, 20b the ends 23 melt differently, i.e. require different amounts of thermal energy to melt. For example, bristle tuft 20a is significantly larger than bristle tuft 20b so that bristle tuft 20a requires more thermal energy to melt. Thus, the distance between end 23 of bristle tuft 20a and the thermal energy source 80 is smaller than the distance between end 23 of bristle tuft 20b and the thermal energy source 80. If the thermal energy is applied the ends 23 melt and form fuse balls 24 (FIG. 3D) which are similar compared to each other due to the different distances to the thermal energy source 80. Thereby, the distance of the bottom edge 25 of the fuse ball 24 of a first bristle tuft 20a to the front surface 61 is different to the distance of the bottom edge 25 of the fuse ball 24 of a second bristle tuft 20b to the front surface 61. For example, bristle tuft 20b which is located in the middle of the bristle filed is shielded against the thermal energy from the thermal energy source 80 by its neighboring bristle tufts 20. Thus, bristle tuft 20b is arranged closer to the thermal energy source 80.

Figure 3E:
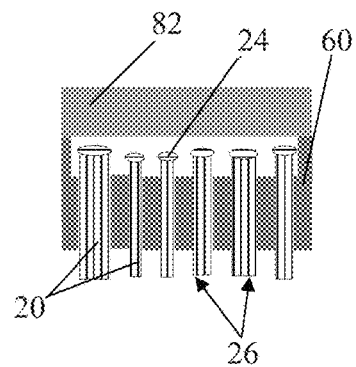
FIG. 3E shows the hole perforation plate, shown in FIGS. 3A-3D after the fuse balls have been formed.
Figure 3F:
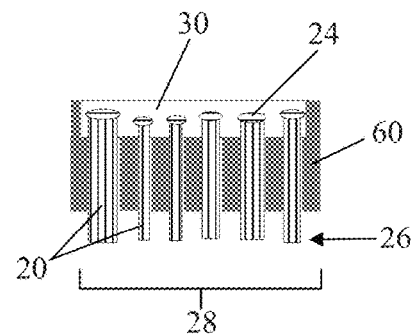
FIG. 3F shows the hole perforation plate, shown in FIGS. 3A-3E, wherein molten material is filled into the mold and the fuse balls are embedded into the material of the cleaning element carrier.

After the fuse balls 24 are formed the bristle tufts 20 are arranged in the hole perforation plate 60 according to the arrangement of the bristle tufts 20 in the bristle field 28 that shall be produced (FIG. 3E). That means, the distance between the fuse balls 24 and the hole perforation plate 60 during fusing can be different than for the subsequent process steps such as molding. The position of the bristle tufts 20 in the hole perforation plate 60 in the molding position is based on the position of the ends 26 intended for cleaning in the bristle field 28. The hole perforation plate 60 represents one part of a mold and together with a second mold half 82 a mold for a cleaning element carrier 30 is provided. Then molten material, e.g. polyethylene is filled into the mold and cleaning element carrier 30 is formed (FIG. 3F) wherein the fuse balls 24 are embedded into the material of the cleaning element carrier 30 and thus, mounted securely thereto.

Figure 3G:
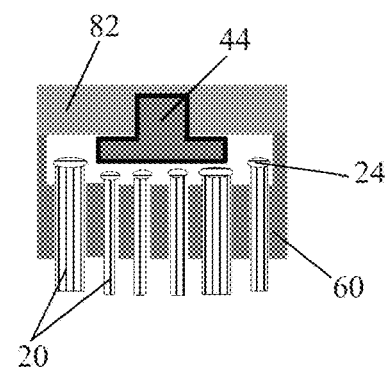
FIG. 3G shows a cross-sectional view of another embodiment of a hole perforation plate, wherein a drive part is partially placed in a mold so that molten material surrounds the fuse balls and a portion of the drive part.
Figure 3H:
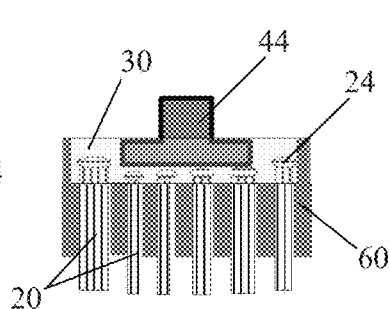
FIG. 3H shows the hole perforation plate shown in FIG. 3G, wherein the drive part is integrated onto the cleaning element carrier.
Figure 3I:
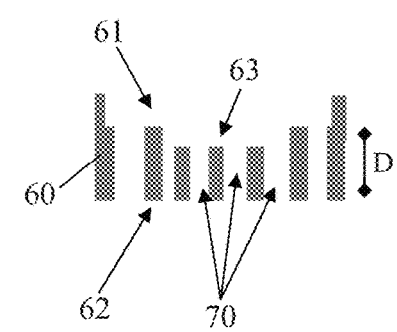
FIG. 3I shows an embodiment of a hole perforation plate comprising a central depression.

FIGS. 3G-3H show an embodiment, wherein a drive part 44 is further integrated into the cleaning element carrier 30. Therefore, the drive 44 is placed partly in the mold so that the molten polyethylene material surrounds the fuse balls 24 and a part of the drive part 44. FIG. 3I shows an embodiment, wherein the hole perforation plate 60 comprises a central depression 63. Said central depression 63 will form a central protrusion 37 in the cleaning element carrier 30 to be formed.

Figure 4A:
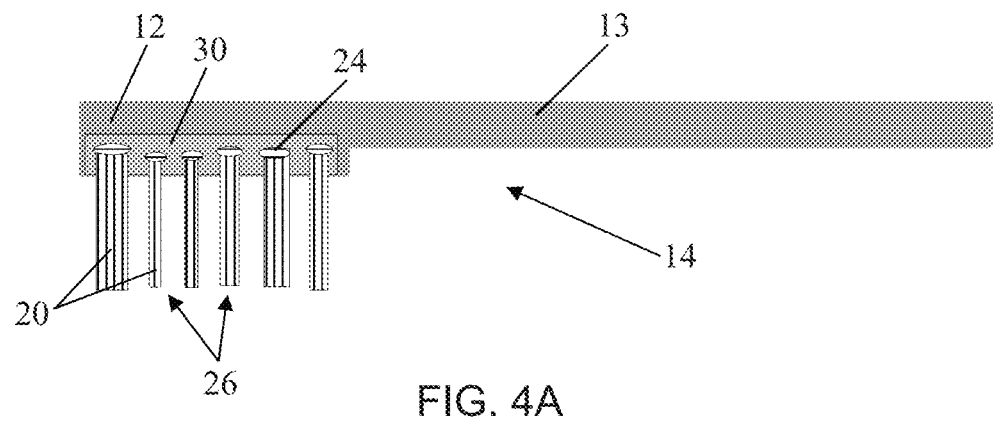
FIG. 4A shows a schematic cross-sectional view of a manual toothbrush.

FIG. 4A shows a schematic and cross-sectional view of a manual toothbrush 14 comprising a handle 13 and a head 12, wherein the head 12 comprises a cleaning element carrier 30 as disclosed herein. The cleaning element carrier 30 comprises several bristle tufts 20, wherein the bristle tufts 20 are each secured with a fuse ball 24 in the cleaning element carrier 30 and the ends 26 intended for cleaning protrude therefrom.

Figure 4B:
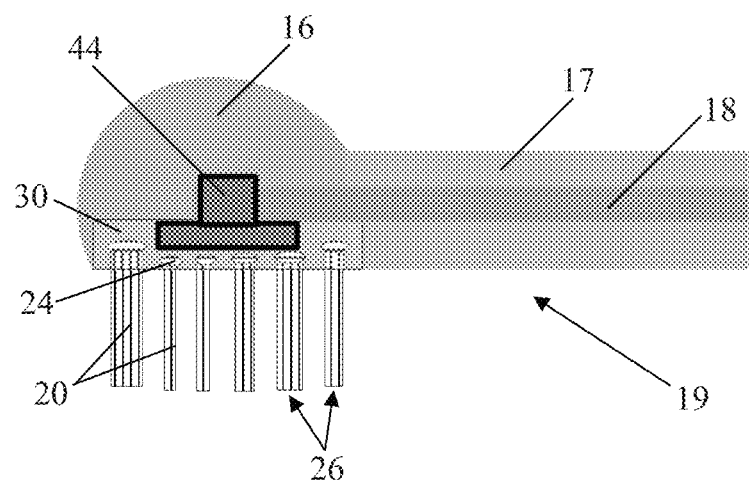
FIG. 4B shows a schematic cross-sectional view of a toothbrush having a replacement brush head.

FIG. 4B shows a schematic and cross-sectional view of a replacement brush head 19 for an electric toothbrush comprising a neck 17 and a head 16. The head 16 comprises a cleaning element carrier 30 as disclosed herein as well as a drive part 44 and a gear connection 18. The cleaning element carrier 30 comprises several bristle tufts 20, wherein the bristle tufts 20 are each secured with a fuse ball 24 in the cleaning element carrier 30 and the ends 26 intended for cleaning protrude therefrom.

Figure 5:
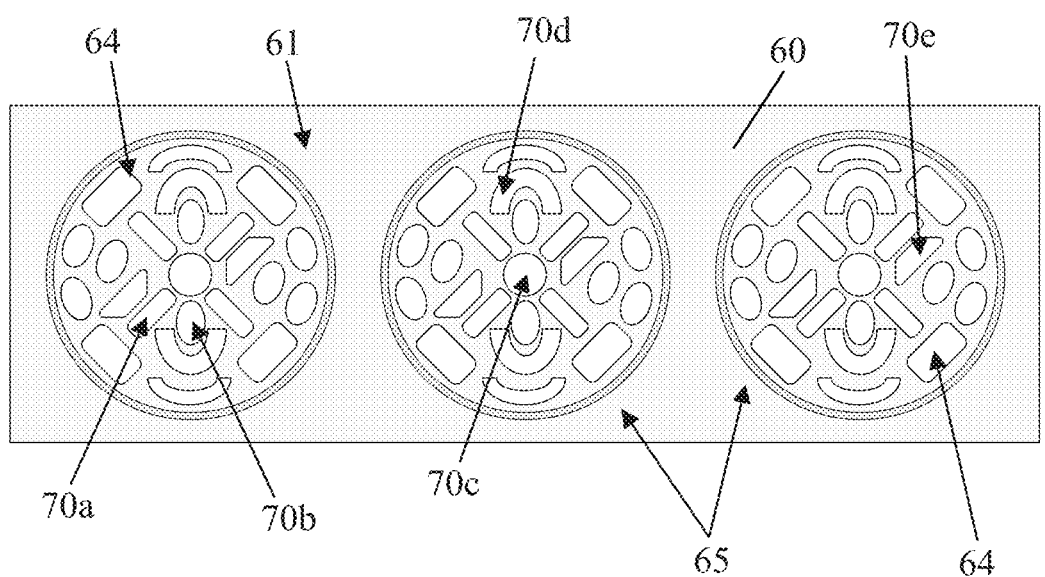
FIG. 5 shows a top view of a hole perforation plate comprising three molds for formation of a cleaning element carrier.

FIG. 5 shows a schematic top view to a front surface 61 of a hole perforation plate 60 comprising three arrangements 65 of holes 70. The arrangements 65 are separated from each other by a distance of at least 2 mm. The holes 70 in the arrangements 65 correspond to and are located according to the bristle field 28 which shall be formed. Different sizes and shapes of holes 70 are possible, e.g. elongated holes 70a, oval holes 70b, round holes 70c, arc shaped hole 70d or trapezoidal holes 70e are shown, but other shapes or sizes might be present depending on the bristle tufts which shall be used. The hole perforation plate 60 further comprises some blind holes 64 which are suitable to receive further cleaning elements, such as elastomeric cleaning elements. More or less than the three arrangements 65 shown can be present in one hole perforation plate 60. Two or more hole perforation plates 60 can be combined to a larger ensemble.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What we claim is:

1. A cleaning element carrier (30) for a toothbrush, wherein the carrier comprises a disk having:
    a front surface (31), a back surface (32), and a thickness (T) therebetween,
    wherein the back surface (32) has a border and comprises
        a first central depression (35) having a first depth (D1) extending from the back surface towards the front surface and terminating intermediate the thickness (T), the first central depression covering at least 70% of an area of the back surface (32), the first central depression forming an edge (34) at the border, and
        a second central depression (36) located at the back surface (32) and having a second depth (D2) extending from the termination of the first depth (D1) and terminating intermediate the thickness (T), the second depth (D2) being less than the first depth (D1),
    wherein the front surface (31) comprises a central protrusion (37) so that the front surface (31) comprises two levels,
    wherein an area covered by the first central depression (35) is larger than an area covered by the protrusion (37), and
    wherein the second central depression (36) covers at least 30% of the area covered by the first central depression (35).

2. The carrier of claim 1, wherein the central protrusion is protruding from the front surface (31) to a distance selected from the group consisting of a distance of from 0.2 mm to 0.6 mm, a distance of from 0.3 mm to 0.5 mm, a distance of from 0.35 mm to 0.45 mm, and a distance of 0.4 mm.

3. The carrier of claim 2, wherein the central protrusion (37) at the front surface (31) covers an area selected from the group consisting of an area of at least 10% of the front surface (31), an area of at least 15% of the front surface (31), and an area of at least 20% of the front surface (31).

4. The carrier of claim 1, wherein the front surface (31) comprises at least one cleaning element.

5. The carrier of claim 4, wherein the at least one cleaning element comprises different types of bristle tufts (20).

6. The carrier of claim 4, wherein the at least one cleaning element is embedded into the cleaning element carrier (30).

7. The carrier of claim 1, wherein the front surface (31) comprises at least one peripheral protrusion having one or more bristle tufts (20).

8. The carrier of claim 1, wherein the first depth (D1) has a range selected from the group consisting of a range from 0.1 mm to 3 mm, a range from 0.5 mm to 2.5 mm, a range from 1.0 mm to 2.0 mm, and a range from 1.5 mm to 1.8 mm.

9. The carrier of claim 1, wherein the first central depression (35) includes at least one groove (39).

10. The carrier of claim 9, wherein the at least one groove (39) comprises a network of grooves connected to one another.

11. The carrier of claim 10, wherein the network of grooves connected to one another comprises an X-shaped network of grooves.

12. The carrier of claim 11, wherein the carrier (38) comprises several voids, each located at a respective end of the X-shaped network.

13. The carrier of claim 12, wherein the carrier (38) comprises a non-bristle cleaning element.

14. The carrier of claim 13, wherein the non-bristle cleaning element is an elastomeric cleaning element (40).

15. The carrier of claim 13, wherein all voids (38) comprise the elastomeric cleaning elements (40) made of the same material.

16. The carrier of claim 15, wherein all voids (38) comprise the elastomeric cleaning element made of thermoplastic elastomer (TPE).

17. The carrier of claim 12, wherein all voids (38) comprise non-bristle tuft cleaning elements made of the same material.

18. The carrier of claim 10, wherein the carrier (38) comprises several voids, each located at an end of each of the grooves (39) of the network.

19. The carrier of claim 9, wherein the carrier comprises at least one void (38) located at an end of the at least one groove (39).

20. The carrier of claim 1, wherein the thickness (T) of the carrier (30) at the border is in the range selected from the group consisting of a range of from 2.0 mm to 4.0 mm, a range of from 2.2 mm to 4.0 mm, and a range of from 2.5 mm to 3.5 mm.

21. The carrier of claim 1, wherein the first central depression (35) in the back surface (32) is structured and configured to be connected to a connection element that is structured and configured to be connected to a drive part (44) of a toothbrush having a toothbrush handle.

22. The carrier of claim 21, wherein the drive part (44) is selected from the group consisting of a driver or a part thereof, a bearing or a part thereof, and any combination thereof.

23. The carrier of claim 22, wherein the carrier (30), the connection element and/or the toothbrush handle (13) are made from polypropylene (PP).

24. The carrier of claim 23, wherein the carrier (30) and the connection element or the carrier (30) and the toothbrush handle (13) are made from polypropylene (PP) of different colors.

25. The carrier of claim 22, wherein the driver and the bearing are made from a plastic material having a Shore D hardness in the range selected from the group consisting of a range of from 60 to 100, a range of from 70 to 90, and a range of from 75 to 85.

26. The carrier of claim 22, wherein the driver and the bearing are made from a material comprising polyoxymethylene (POM).

27. The carrier of claim 1, wherein the carrier is a part of a manual toothbrush (14) or a replacement brush head (19) for an electric toothbrush.

\* \* \* \* \*